3,139,111
PNEUMATIC MEMORY DEVICE
Charles G. Schneider, Pittsburgh, and William E. Swartz, McKeesport, Pa., assignors to Calgon Corporation, a corporation of Pennsylvania
Filed Jan. 8, 1962, Ser. No. 164,875
1 Claim. (Cl. 137—624.18)

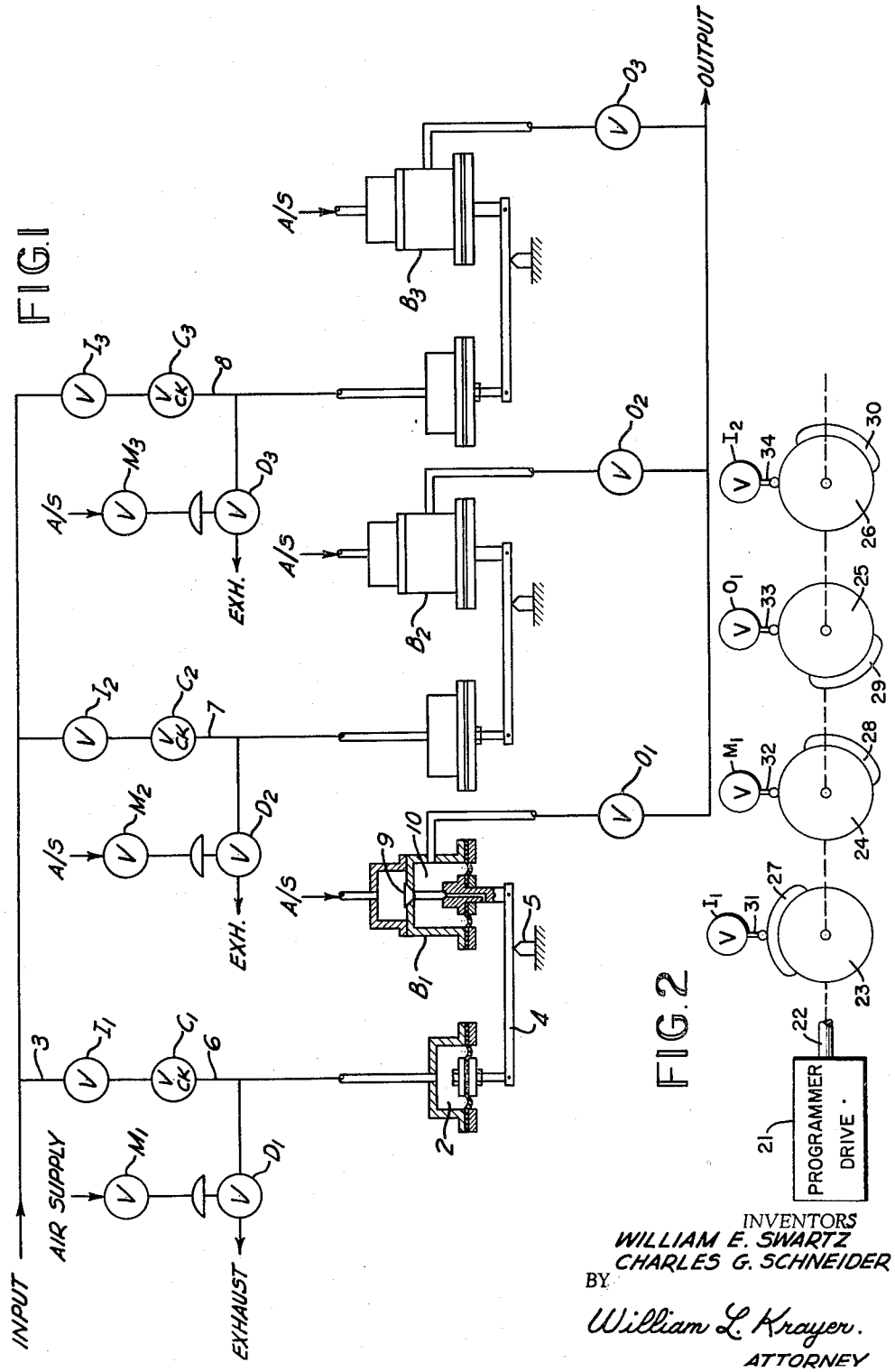

This invention relates to pneumatic memory apparatus. More particularly, it relates to apparatus for storing pneumatic pressure signals and releasing them for actuation of valves, pneumatic sensing devices, and the like on direction of a programmer or the like.

In automatic machinery operated by pneumatic signals, it is often the case that a period of time will elapse between the development of a signal and its application. For example, at one stage in a process a pneumatic signal may be developed which is proportional to the level of liquid in a container on a moving conveyor. At another stage of the operation, it may be desired, as an example, to add an additional amount of another liquid in an amount proportional to the original liquid level. If there is an elapse of time between the points at which the two operations are performed the device receiving the pneumatic signal must preserve its original value in some manner. In most cases heretofore the result was that only one signal could be handled at a time; i.e. the variable is measured and the signal generated at one processing point, the object conveyed to the next processing point where the required step is performed on direction of the previously developed signal, and not until after this step is performed is the apparatus free to accommodate a new signal.

Our invention provides means by which more than one pneumatic signal may be handled at a time. It is especially applicable to conveying apparatus for a process line, where it may increase the speed of the line considerably. As will be explained, one or more original signals may be developed and preserved in the time required for conveying an object from the first point to the second.

FIGURE 1 is a more or less diagrammatic illustration of a three-section system of our invention, e.g. capable of handling three signals.

Operation of the preferred form will be discussed along with the description of FIGURE 1. FIG. 1 represents a three-section memory system employing standard commercially available components. Of course, it is understood that similar systems may be constructed having two, four, or more sections.

In FIG. 1, it will be seen that there are three identical sections. The signal input and signal output are not part of any section, but are connected to all sections at the inputs and outputs respectively.

A brief description of the first section will serve to describe all sections. Devices $I_2$ and $I_3$, for example, correspond to device $I_1$ of the first section. Device $I_1$ is a normally closed mechanically operated valve to which pneumatic conduit 3 is connected. When energized or opened, it permits the input signal in line 3 to pass to check valve $C_1$. Check valve $C_1$ prevents the backflow of air from $S_1$ toward $I_1$. Thus, when $I_1$ is open, it permits the signal in line 3 (the input signal) to contact devices $D_1$ and $B_1$. If it is thereafter closed, this signal is trapped in contact with devices $D_1$ and $B_1$. Device $B_1$ is a booster or relay having a dead-end input. It generates a new pneumatic signal proportional to the input preferably of a greater value than its input. This new signal is transmitted to valve $O_1$, which is a mechanically operated normally closed valve. If this valve is open, the signal will constitute the signal output. Device $D_1$ is a normally closed two-way valve positioned such that, when it is open, it will release to atmosphere the signal in the line from $I_1$ to $B_1$. Device $M_1$ is a mechanically operated valve which may be used to operate valve $D_1$ by opening an operating air supply to it.

The three sections are connected in such a way that, when properly programmed, they operate as a memory and delayed activating device. For example, a signal input may be introduced to the first section while valves $I_2$ and $I_3$ are closed. This signal, which we may call signal I, is effectively trapped in line 6 by check valve $C_1$ so long as valve $D_1$ is closed also. When a new input signal II is introduced, valve $I_1$ is closed while only valve $I_2$ is opened, introducing signal II to line 7 where it is trapped. A similar sequence may take place in the third section. When input signal III is introduced, valves $I_1$ and $I_2$ are closed while valve $I_3$ is open. Signal III is trapped in line 8. In each case, the boosters $B_1$, $B_2$, and $B_3$ generate new signals proportional to the input signals which, however, are blocked by the respective valves $O_1$, $O_2$, and $O_3$ until opened. Any of the three (or more, if more sections are employed) may be selected as the output of the system by opening one of the valves $O_1$, $O_2$, or $O_3$. The inputs will be retained as long as desired. When they are no longer needed, valve $D_1$, $D_2$, or $D_3$ may be opened and the trapped signal released to atmosphere.

In a preferred sequence of operation for a conveying system or the like having a known or regulated time delay between input and output, we prefer to utilize a rotary mechanical programmer. Such programmers are equipped with cams to operate the mechanically-operated valves, and are known in the art. A typical programmer of the preferred type is Sinclair Collins Cycle Controller (Model E186T) with eight pneumatic valves, fully described in a booklet entitled "The Sinclair Collins Cycle Controller" published by the Sinclair Collins Valve Company, Akron, Ohio. Another preferred programmer is Model T–325–88 of the same manufacturer. The programmer is rotated at a constant speed. It opens valve $I_1$ first and after a predetermined interval opens valve $O_1$, in the meantime having closed valve $I_1$ and opened valve $I_2$, $I_3$, and so on. Table I illustrates the preferred sequence of operation. In the column on the left are degrees of rotation. Across the top are the valves. The designation "O" means open, while "X" means closed. Of course any programmer or other means for accomplishing a desired sequence of operation may be used.

Table I

|         | $I_1$ | $I_2$ | $I_3$ | $O_1$ | $O_2$ | $O_3$ | $D_1$ | $M_1$ | $D_2$ | $M_2$ | $D_3$ | $M_3$ |
|---------|---|---|---|---|---|---|---|---|---|---|---|---|
| 0–20    | O | X | X | X | O | X | X | X | X | X | X | X |
| 20–40   | O | X | X | X | O | X | X | X | X | X | X | X |
| 40–60   | O | X | X | X | O | X | X | X | X | X | X | X |
| 60–80   | O | X | X | X | O | X | X | X | X | X | X | X |
| 80–100  | O | X | X | X | O | X | X | X | X | X | X | X |
| 100–120 | O | X | X | X | O | X | X | X | O | O | X | X |
| 120–140 | X | O | X | X | X | O | X | X | X | X | X | X |
| 140–160 | X | O | X | X | X | O | X | X | X | X | X | X |
| 160–180 | X | O | X | X | X | O | X | X | X | X | X | X |
| 180–200 | X | O | X | X | X | O | X | X | X | X | X | X |
| 200–220 | X | O | X | X | X | O | X | X | X | X | X | X |
| 220–240 | X | O | X | X | X | O | X | X | X | X | O | O |
| 240–260 | X | X | O | O | X | X | X | X | X | X | X | X |
| 260–280 | X | X | O | O | X | X | X | X | X | X | X | X |
| 280–300 | X | X | O | O | X | X | X | X | X | X | X | X |
| 300–320 | X | X | O | O | X | X | X | X | X | X | X | X |
| 320–340 | X | X | O | O | X | X | X | X | X | X | X | X |
| 340–360 | X | X | O | O | X | X | X | O | O | X | X | X |

O=open; X=closed.

It will be apparent to those skilled in the art to which the invention pertains that any means for operating the valves may be used. For example, they may be solenoid or hydraulically operated. Programmers may be other than the electromechanical cam type which are presently preferred. Solenoid valves would of course lend themselves readily to control by an electronic program mer. Fluid pressure signals other than pneumatic signals are also operable in our invention.

A preferred type of programmer is more or less diagrammatically illustrated in FIGURE 2. Programmer drive 21 has a rotating shaft 22 on which is mounted cams 23, 24, 25, 26 and others not illustrated. Cam surfaces 27, 28, 29 and 30 are mounted on their respective cams, and cam followers 31, 32, 33, and 34 mechanically operate valves $I_1$, $M_1$, $O_1$, and $I_2$ in the sequence shown in Table I. For this particularly sequence, having three signal delay circuits, the cam surfaces are 120° as indicated in the table. Nine such cams are necessary to operate the three circuits illustrated.

Any standard booster or relay may be substituted for devices $B_1$, $B_2$ and $B_3$. A preferred booster is Governaire Model 2000 Volume Booster Relay manufactured by Stratos Division of Fairchild Engine and Airplane Corporation fully described in a publication of the manufacturer entitled "Governaire Models 2000 and 45000 Volume Booster Relays."

The relay $B_1$ shown in the drawing, which is a suitable substitute for the booster, operates as follows: The signal in line 6 exerts its force on the diaphragm in left chamber 2 tending to rotate beam 4 counterclockwise on fulcrum 5. This lifts valve 9, permitting the air supply to enter chamber 10 to the extent necessary to balance the moment of force on the left side of the beam. The pressure in chamber 10 constitutes the output signal to valve $O_1$. It will be apparent to those skilled in the art that relays $B_1$, $B_2$ and $B_3$ should for most uses be adjusted to the same pressure ratio.

Our invention is particularly useful in pneumatic weighing, conveying, and sorting apparatus. An example of this type of use for our invention may be seen in our disclosure together with Owen Rice, filed concurrently herewith, entitled "Sorting Apparatus" which bears Serial No. 164,876.

As is indicated from the above, we do not intend to be restricted to the specific representative embodiments illustrated and described herein. Rather, our invention may be otherwise embodied within the scope of the following claims.

We claim:

Fluid pressure memory apparatus comprising (1) a plurality of fluid pressure signal delay circuits adapted to receive variable fluid pressure input signals from a common source and to selectively transmit said signals, each of said delay circuits comprising:

(a) a normally closed input valve, (b) a check valve adapted to transmit a fluid pressure memory signal from said normally closed input valve, (c) a relay for receiving said memory signal and generating a separate output signal as a function thereof, (d) normally closed valve means adapted to transmit said output signal when opened, (e) exhaust means for releasing said memory signal to exhaust, and (2) programming means for selectively admitting input signals, transmitting output signals, and operating said exhaust means in predetermined sequence.

References Cited in the file of this patent

UNITED STATES PATENTS

| | | |
|---|---|---|
| 930,033 | Bither | Aug. 3, 1909 |
| 1,621,620 | Bast | Mar. 22, 1927 |
| 2,270,304 | Jacobsson | Jan. 20, 1942 |
| 2,294,487 | Stettner | Sept. 1, 1942 |
| 2,694,407 | Jobson | Nov. 16, 1954 |
| 2,963,040 | Zimmer | Dec. 6, 1960 |